UNITED STATES PATENT OFFICE.

CHARLES F. CROSELMIRE, OF NEWARK, NEW JERSEY.

PROCESS OF OBTAINING SULPHATE OF ZINC FROM ZINCIFEROUS ORES.

SPECIFICATION forming part of Letters Patent No. 457,256, dated August 4, 1891.

Application filed March 31, 1888. Renewed February 3, 1891. Serial No. 379,974. (Specimens.)

*To all whom it may concern:*

Be it known that I, CHARLES F. CROSELMIRE, a citizen of the United States, residing at Newark, in the county of Essex and State of New Jersey, have invented certain new and useful Improvements in the Process of Obtaining Sulphate of Zinc from Zinciferous Ores; and I do hereby declare the following to be a full, clear, and exact description of the invention, such as will enable others skilled in the art to which it appertains to make and use the same.

My invention relates to an improvement in the process of extracting or obtaining sulphate of zinc from zinciferous ores, already patented to me, as fully set forth in Patent No. 374,769, dated March 20, 1888; and my improvement consists in further treatment of the zinc-sulphate solution obtained by the process described in the patent aforesaid, in which the ore is pulverized and fed into a furnace, where it is roasted. The roasted ore is removed from the furnace and placed in a tank or vat containing a dilute acid solution, in which the sulphate of zinc is held in solution and most of the other metals contained in the ore are precipitated. Where the ore contains iron and manganese, they are also attacked by the acid, and a considerable part of these metals is held in solution with the sulphate of zinc. A blast of air or steam is then introduced into or through this solution, which has the effect of throwing down the iron and manganese, leaving the sulphate of zinc alone in solution. This sulphate of zinc solution is afterward drawn off, leaving the foreign metals as deposits in the bottom of the tank, and the zinc is subsequently deposited from the sulphate in any of the known ways. This, as claimed, produces a pure sulphate of zinc, and yet I have found in practice that it is not absolutely pure, but still contains a trace of iron or manganese. I also find that where alumina is present that the solution contains a small proportion of this salt.

My present improvement is for the purpose of getting rid of these residues, and it consists in an additional step, as follows, viz: After the blast of air or steam is used to throw down the metals other than the zinc, instead of drawing off the sulphate of zinc solution obtained by the process above referred to for the purpose of precipitating the zinc I draw it off into another tank or vat. As already stated, this solution contains a trace of iron and manganese or iron and alumina. After having drawn off this solution into a separate tank or vat I add a sufficient quantity of chloride of lime proportionate to the bulk or quantity of the zinc-sulphate solution and inject into or through it steam, superheated steam, or hot air. This further step throws down every particle of the foreign metals or salts thereof and leaves the sulphate of zinc only in a free liquid state, and the salt afterward formed by any well-known means. It will be understood from the foregoing that the pulverized ore is dissolved by the acid solution in which it is placed. This further step is especially important where iron and alumina are present in the solution, and the steam or hot air with the chloride of lime precipitates every trace of these substances, leaving an absolutely pure zinc solution.

By this process I set free iron and alumina from zinc sulphate and other zinc solutions where iron and alumina are present, giving a chemically-pure zinc sulphate from zinciferous ores or metallic zinc which contains iron and alumina.

Having thus described my improvement, what I claim as new is—

That improvement in the process of obtaining sulphate of zinc from zinciferous ores where iron and alumina are present, which consists in pulverizing the ore and roasting it, placing it in a dilute acid solution, and then injecting into or through said solution steam, superheated steam, or hot air with chloride of lime for the purpose of depositing any trace of iron and alumina that may be present, substantially as set forth.

In testimony whereof I affix my signature in presence of two witnesses.

C. F. CROSELMIRE.

Witnesses:
P. I. KISER,
J. O. ELLIOTT.